US008340643B2

(12) United States Patent
Higuchi et al.

(10) Patent No.: US 8,340,643 B2
(45) Date of Patent: Dec. 25, 2012

(54) RESPONSE MESSAGE TRANSMITTER AND RESPONSE MESSAGE TRANSMITTING METHOD IN CELLULAR MOBILE TELEPHONE APPARATUS AND RECORDING MEDIUM RECORDING PROGRAM FOR EXECUTING THE METHOD

(75) Inventors: Kazutoshi Higuchi, Yokohama (JP);
Katsuo Ogawa, Higashimurayama (JP);
Fumitaka Itoh, Inzai (JP); Yasuaki Takahara, Yokohama (JP); Teiji Okamoto, Hadano (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/081,141

(22) Filed: Apr. 11, 2008

(65) Prior Publication Data

US 2008/0299949 A1    Dec. 4, 2008

Related U.S. Application Data

(63) Continuation of application No. 10/817,833, filed on Apr. 6, 2004, now abandoned, which is a continuation of application No. 10/460,184, filed on Jun. 13, 2003, now Pat. No. 6,799,034, which is a continuation of application No. 10/052,442, filed on Jan. 23, 2002, now abandoned, which is a continuation of application No. 09/818,508, filed on Mar. 28, 2001, now Pat. No. 6,539,218, which is a continuation of application No. 08/997,921, filed on Dec. 24, 1997, now Pat. No. 6,275,690.

(30) Foreign Application Priority Data

Dec. 27, 1996   (JP) .................................. 08-349425

(51) Int. Cl.
| | |
|---|---|
| *H04M 1/725* | (2006.01) |
| *H04M 3/42* | (2006.01) |
| *H04M 1/00* | (2006.01) |
| *H04M 3/00* | (2006.01) |
| *H04B 1/38* | (2006.01) |

(52) U.S. Cl. .................... 455/412.2; 455/564; 455/567; 379/41; 379/164; 379/266.01

(58) Field of Classification Search ............... 455/412.1, 455/412.2, 413
See application file for complete search history.

(56) References Cited

U.S. PATENT DOCUMENTS

| | | | |
|---|---|---|---|
| 4,495,547 A | 1/1985 | Stoverock | |
| 4,495,647 A | 1/1985 | Burke et al. | |
| 4,713,808 A | 12/1987 | Gaskill et al. | |
| 4,941,167 A * | 7/1990 | Cannalte et al. | ........... 379/88.26 |
| 5,031,205 A | 7/1991 | Phillips | |
| 5,058,150 A | 10/1991 | Kang | |

(Continued)

FOREIGN PATENT DOCUMENTS

DE    3010745    9/1981

(Continued)

*Primary Examiner* — Charles Appiah
*Assistant Examiner* — Natasha Cosme
(74) *Attorney, Agent, or Firm* — Jefferson IP Law, LLP

(57) ABSTRACT

A cellular mobile telephone apparatus has circuits for generating messages, a storage circuit for storing messages, and transmitter/receiver circuit for transmitting a message. When the user of the cellular mobile telephone apparatus cannot immediately respond to an incoming call, a desired one of a plurality of previously generated and stored messages can be transmitted to a calling party through simple key manipulations or by other means.

29 Claims, 11 Drawing Sheets

U.S. PATENT DOCUMENTS

| | | | |
|---|---|---|---|
| 5,189,692 A | 2/1993 | Ferrara | |
| 5,222,121 A | 6/1993 | Shimada | |
| 5,301,227 A | 4/1994 | Kamei et al. | |
| 5,559,880 A | 9/1996 | Shiono | |
| 5,574,775 A * | 11/1996 | Miller et al. | 455/444 |
| 5,630,207 A | 5/1997 | Gitlin et al. | |
| 5,642,413 A | 6/1997 | Little | |
| 5,659,597 A | 8/1997 | Bareis et al. | |
| 5,758,280 A | 5/1998 | Kimura | |
| 5,771,438 A | 6/1998 | Palermo et al. | |
| 5,790,957 A | 8/1998 | Heidari | |
| 5,802,460 A | 9/1998 | Parvulescu et al. | |
| 5,835,569 A | 11/1998 | Ajiro | |
| 5,884,200 A * | 3/1999 | Yamane et al. | 455/575.1 |
| 5,894,506 A | 4/1999 | Pinter | |
| 5,924,044 A | 7/1999 | Vannatta et al. | |
| 5,930,709 A | 7/1999 | Park et al. | |
| 6,018,671 A * | 1/2000 | Bremer | 455/567 |
| 6,118,995 A | 9/2000 | Perdomo | |
| 6,216,016 B1 * | 4/2001 | Cronin | 455/567 |
| 6,275,690 B1 | 8/2001 | Higuchi et al. | |
| 6,301,338 B1 | 10/2001 | Makela et al. | |
| 6,539,218 B2 | 3/2003 | Higuchi et al. | |
| 6,799,034 B2 | 9/2004 | Higuchi et al. | |

FOREIGN PATENT DOCUMENTS

| | | |
|---|---|---|
| EP | 0 693 860 | 1/1996 |
| EP | 0 740 449 | 10/1996 |
| EP | 763 958 | 3/1997 |
| GB | 2290437 | 12/1995 |
| JP | 62-038646 | 2/1987 |
| JP | 63-020643 | 2/1988 |
| JP | 04-123560 | 4/1992 |
| JP | 04-358446 | 12/1992 |
| JP | 05-048711 | 2/1993 |
| JP | 05-199305 | 8/1993 |
| JP | 05-344198 | 12/1993 |
| JP | 06-046113 | 2/1994 |
| JP | 06-030105 | 4/1994 |
| JP | 06-141068 | 5/1994 |
| JP | 06-284083 | 10/1994 |
| JP | 07-046300 | 2/1995 |
| JP | 07-115680 | 5/1995 |
| JP | 07-203014 | 8/1995 |
| JP | 08-097902 | 4/1996 |
| JP | 8-163208 | 6/1996 |
| JP | 08-223257 | 8/1996 |
| JP | 08-289000 | 11/1996 |
| JP | 08-321875 | 12/1996 |
| JP | 9102817 | 4/1997 |
| JP | 2000-278764 | 10/2000 |
| WO | 93/15590 | 8/1993 |
| WO | WO9612378 | 4/1996 |

* cited by examiner

RESPONSE MESSAGE TRANSMITTER AND RESPONSE MESSAGE TRANSMITTING METHOD IN CELLULAR MOBILE TELEPHONE APPARATUS AND RECORDING MEDIUM RECORDING PROGRAM FOR EXECUTING THE METHOD

CROSS-REFERENCES

This is a continuation application of U.S. Ser. No. 10/817,833, filed Apr. 6, 2004 (now abandoned), which is a continuation application of U.S. Ser. No. 10/460,184, filed Jun. 13, 2003, now U.S. Pat. No. 6,799,034, which is a continuation application of U.S. Ser. No. 10/052,442, filed Jan. 23, 2002, now abandoned, which is a continuation application of U.S. Ser. No. 09/818,508, filed on Mar. 28, 2001, now U.S. Pat. No. 6,539,218, which is a continuation of U.S. Ser. No. 08/997,921, filed Dec. 24, 1997, now U.S. Pat. No. 6,275,690. This application is related to U.S. Ser. No. 09/634,870, filed Aug. 7, 2000, now U.S. Pat. No. 6,823,182.

BACKGROUND OF THE INVENTION

The present invention relates generally to a response message transmitter in a portable mobile radio communication apparatus such as a portable telephone apparatus, a cordless telephone apparatus, or the like, and more particularly to a response message transmitter in a cellular mobile telephone apparatus, which is operable to notify the calling party when the cellular mobile telephone apparatus receives an incoming call but the user cannot immediately answer a calling party, for example, because the user is driving a vehicle or the like, or because the user is in a place where the use of cellular mobile telephones and so on is restricted, or the like.

With a currently used cellular mobile telephone apparatus, when an incoming call is received, although the user should respond to the call, the user is not always immediately ready to do so. Particularly, when the user is driving a vehicle or the like, the user cannot immediately respond to a call. Conventional cellular mobile telephone apparatus have a special function of answering a call so as to cope with such a situation. This function is invoked by depressing a pending button, when the user cannot immediately accept a call, to notify a calling party through a base station that the user cannot immediately respond to the call although the telephone line connection has been established therebetween, to reduce the volume of the telephone ring, and to permit the user to initiate a communication when the user is ready to do so. Such a cellular mobile telephone apparatus is disclosed in JP-A-8-163208.

However, such a simple response message function is not sufficient to notify a calling party of specific reasons for which the user is "pending" a call. More specifically, the calling party cannot know whether the user cannot respond to a call because he or she is now in a place where the use of cellular mobile telephone apparatus is restricted, and is moving from that place; or because the user is now busy with other business; or because the user is driving a vehicle or the like so that he/she cannot respond to a call before he/she stops driving. It can therefore be thought that the pending state extends over such long time period that the calling party gives up the call, as the case may be.

With the conventional cellular mobile telephone apparatus as described above, the user suffers from an inconvenience when an incoming call is received but the user cannot immediately respond to the call because the conventional cellular mobile telephone apparatus does not have any means for notifying a calling party of the current situation of the user. In addition, the calling party cannot know the current situation which the user of the destination cellular mobile telephone apparatus is experiencing.

According to certain data, traffic accidents related to the cellular mobile telephone apparatus during the operation of a vehicle happen more while drivers are looking for their cellular mobile telephone apparatus for placing a call or for responding to an incoming call than while they are actually communicating. The conventional cellular mobile telephone apparatus have not at all been designed in consideration of improvements, particularly, in the usability addressed to such a situation.

Furthermore, it has been found from exemplary usage that when the users carry their cellular mobile telephone apparatus with them, most of the users keep it in a bag or the like. Thus, even though the user is in a situation in which he/she cannot immediately respond to an incoming call, the user must once take the cellular mobile telephone apparatus from his/her bag, each time an incoming call is received in such a situation, for invoking the "pending" operation. It can therefore be seen that the conventional cellular mobile telephone apparatus have not been designed in any consideration of improvements in the usability addressed to such a situation.

SUMMARY OF THE INVENTION

The present invention has been made in view of the problems mentioned above inherent to the prior art cellular mobile telephone apparatus. It is therefore an object of the present invention to provide a response message transmitter in a cellular mobile telephone apparatus which permits the user of the cellular mobile telephone apparatus to notify, even if he/she cannot immediately respond to a call, a calling party of the current situation of the user through simple manipulations.

According to the present invention, a cellular mobile telephone apparatus comprises incoming call responding means for responding to an incoming call from a calling party, means for storing a plurality of messages to be transmitted to the calling party, means for selecting a message to the calling party, and means for transmitting a selected message to the calling party, wherein a message to the calling party, previously selected by the user and stored in the storing means, can be transmitted to the calling party by the action of the incoming call responding means when the user cannot immediately respond to the call from the calling party.

The cellular mobile telephone apparatus further comprises a plurality of response switches corresponding to the stored messages, as the incoming call responding means, wherein the user may select a message to the calling party with the plurality of response switches, and respond to the calling party by transmitting the selected message.

The cellular mobile telephone apparatus is designed to previously select one of the plurality of messages and automatically transmit the selected message in response to the incoming call.

The cellular mobile telephone apparatus further comprises a change-over switch as the means for selecting a message to the calling party, and a response switch as the incoming call responding means, wherein the user may select a message to the calling party with the change-over switch and respond to the calling party with the response switch.

The cellular mobile telephone apparatus further comprises a speech coding encoder/decoder circuit for use in a digital telephone system. The speech coding encoder/decoder circuit may be utilized, when a message to a calling party is generated, to convert an analog voice signal to a digital voice signal so that the digital voice signal can be stored in the cellular mobile telephone apparatus.

The cellular mobile telephone apparatus further comprises means for detecting voice while the reception of an incoming call is being notified, wherein a response can be made to a calling party by detecting voice of the user during the notification of the incoming call reception.

The cellular mobile telephone apparatus further comprises means for recognizing a voice pattern, wherein the recognizing means detects a voice pattern while the reception of an incoming call is being notified, such that the user can respond to a calling party by transmitting a message to the calling party selected on the basis of the detected voice pattern.

The cellular mobile telephone apparatus further comprises a speech coding encoder/decoder circuit for use in a digital telephone system which is utilized to convert an analog voice signal to a digital voice signal so that voice can be detected or a voice pattern can be recognized.

The present invention also provides a cellular mobile telephone apparatus comprising a cellular mobile telephone body and an incoming call communicator for notifying the reception of an incoming call, wherein:

the cellular mobile telephone body includes transmitting/receiving means for transmitting and receiving information to and from the incoming call communicator through a radio channel, incoming call responding means for responding to an incoming call from a calling party, means for storing a message to the calling party, and means for transmitting the message to the calling party; and the incoming call communicator includes incoming call responding means for responding to an incoming call received from a calling party, and transmitting/receiving means for transmitting and receiving information to and from the cellular mobile telephone body through a radio channel, wherein incoming call information is transmitted from the cellular mobile telephone body to the incoming call communicator when an incoming call is received, and if the user cannot respond immediately to the incoming call from the calling party, response information is transmitted from the incoming call communicator to the cellular mobile telephone body by the action of the incoming call responding means, so that the cellular mobile telephone body can transmit the previously stored message to the calling party.

The present invention further provides a cellular mobile telephone apparatus comprising a cellular mobile telephone body and an incoming call communicator for notifying the reception of an incoming call, wherein:

the cellular mobile telephone body includes transmitting/receiving means for transmitting and receiving information to and from the incoming call communicator through a radio channel, incoming call responding means for responding to an incoming call from a calling party, means for storing a plurality of messages to the calling party, means for selecting a message to the calling party, and means for transmitting a selected message to the calling party; and the incoming call communicator includes incoming call responding means for responding to an incoming call from a calling party, means for selecting a message to the calling party, and transmitting/receiving means for transmitting and receiving information to and from the cellular mobile telephone body through a radio channel, wherein incoming call information is transmitted from the cellular mobile telephone body to the incoming call communicator when an incoming call is received, and if the user cannot respond immediately to the call received from the calling party, response information is transmitted from the incoming call communicator to the cellular mobile telephone body by the action of the incoming call responding means, so that the cellular mobile telephone body can transmit a previously stored message to the calling party, selected by a user, to the calling party.

The incoming call communicator further includes a plurality of response switches corresponding to the stored messages, as the incoming call responding means, wherein the user may select a message to the calling party with the plurality of response switches and respond to the calling party by transmitting the selected message.

The incoming call communication is designed to previously select one of the plurality of messages and automatically transmit the selected message in response to the incoming call.

The incoming call communicator further includes a change-over switch as the means for selecting a message to the calling party, and a response switch as the incoming call responding means, wherein the user may select a message to the calling party with the change-over switch and respond to the calling party with the response switch.

The incoming call communicator further includes means for detecting voice while the reception of an incoming call is being notified, wherein response information can be sent to the cellular mobile telephone body by detecting voice of the user during the notification of the incoming call reception.

The incoming call communicator further includes means for recognizing a voice pattern, wherein the recognizing means detects a voice pattern while the reception of an incoming call is being notified, such that response information is changed in accordance with the voice pattern to select one of the messages to be sent to the calling party stored in the cellular mobile telephone body, whereby the calling party can be notified with the selected message.

The incoming call communicator further includes means for displaying time and date, and a holding strap with which the user may hold the incoming call communicator on his/her body such as an arm.

BRIEF DESCRIPTION OF THE DRAWINGS

FIG. 6A illustrates a cellular mobile telephone body, and FIG. 6B illustrates an incoming call communicator for use with the body;

DESCRIPTION OF THE PREFERRED EMBODIMENTS

Embodiments of the present invention will hereinafter be described with reference to the accompanying drawings.

Figure 1:
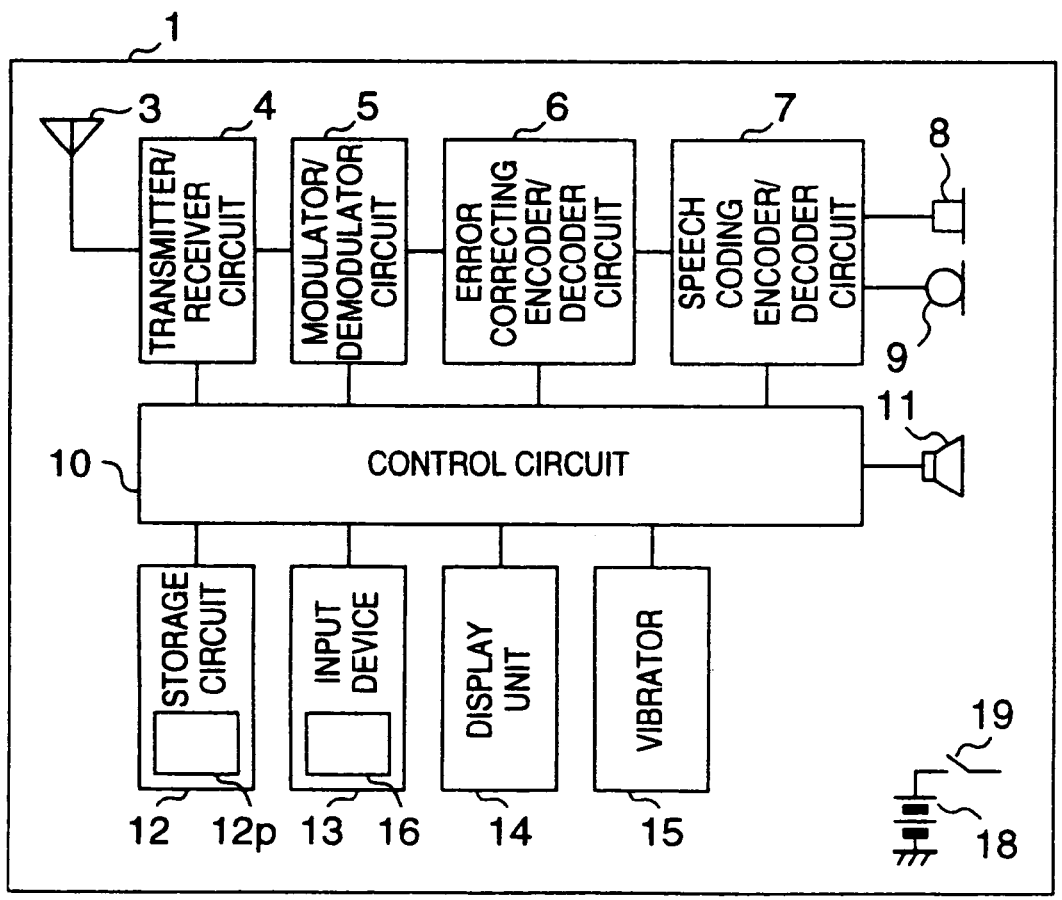
FIG. 1 is a block diagram illustrating an embodiment of a cellular mobile telephone apparatus according to the present invention.
Figure 2:
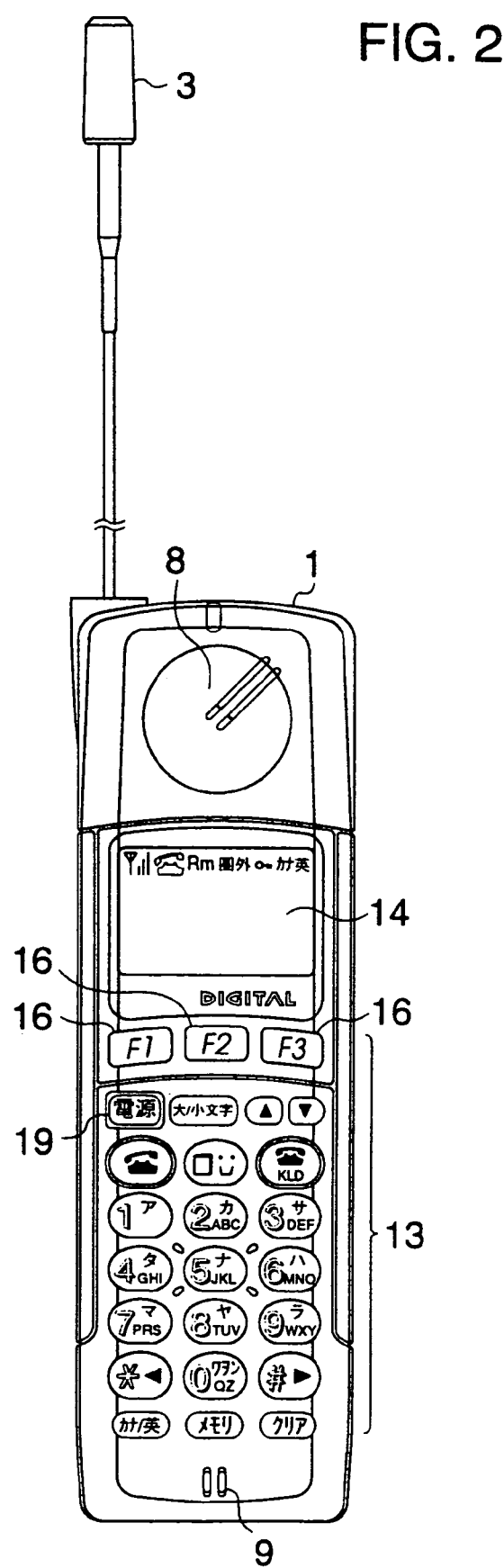
FIG. 2 is a plan view depicting an outer appearance of the cellular mobile telephone apparatus illustrated in FIG. 1.

FIG. 1 is a block diagram illustrating the configuration of a cellular mobile telephone apparatus according to one embodiment of the present invention. FIG. 2 depicts an outer appearance of the cellular mobile telephone apparatus illustrated in FIG. 1.

As illustrated in FIG. 1, a radio communication signal sent from a base station (not shown) is inputted to a radio transmitter/receiver circuit 4 through an antenna 3 in a cellular mobile telephone apparatus 1. The received radio communication signal is converted to an intermediate frequency signal in the radio transmitter/receiver circuit 4. Then, the received intermediate frequency signal is demodulated to a digital signal by a digital modulator/demodulator circuit 5, and the demodulated digital signal is decoded by an error correcting encoder/decoder circuit 6. Digital signals decoded by and outputted from the error correcting encoder/decoder circuit 6 include a digital communication signal and a digital control signal, and the digital control signal is supplied to and identified by a control circuit 10. The digital communication signal, in turn, is decoded by a speech coding encoder/decoder circuit 7 to restore an analog communication signal which is subsequently outputted from an audio output device 8.

On the other hand, outgoing speech is first transduced to a transmission signal by a transducer 9, and the transmission signal is then converted to a digital transmission signal by the speech coding encoder/decoder circuit 7. The digital transmission signal, after being encoded in the error correcting encoder/decoder circuit 6 together with a digital control signal generated in the control circuit 10, is inputted to the digital modulator/demodulator circuit 5 and modulated to an orthogonally modulated signal therein. The modulated signal is transmitted to the base station from the antenna 3 after being converted to a high frequency signal by the radio transmitter/receiver circuit 4 for transmission through a predetermined radio channel.

The control circuit 10, which employs a microcomputer as a main control unit, has means for generating a message to a calling party, means for storing such messages in a memory, and means for transmitting a message to a calling party, in addition to functions for controlling respective components of the cellular mobile telephone apparatus 1.

Electrical power required by the cellular mobile telephone apparatus 1 is generated by a battery power supply 18 and supplied to respective components through a power supply switch 19.

Next, the operation of the cellular mobile telephone apparatus 1 according to this embodiment of the present invention will be described with reference again to FIGS. 1 and 2 as well as to FIG. 3 illustrating an operation flow chart.

When it is assumed that the user cannot immediately respond to an incoming call because the user is driving a vehicle or the like, the cellular mobile telephone apparatus 1 may have previously created a message to cope with such a situation. More specifically, an analog voice signal from the transducer 9 is converted to serial digital data by the speech coding encoder/decoder circuit 7. The serial digital data is then converted to a parallel signal by the error correcting encoder/decoder circuit 6 and stored in a storage circuit 12 through the control circuit 10.

It should be noted that the storage circuit 12 is not provided exclusively for storing messages but is also shared by the control circuit 10 for its control purposes.

Alternatively, messages stored in the storage circuit 12 may be previously written into a read only memory (ROM) such that the user need not register messages.

The operation flow of the cellular mobile telephone apparatus 1 when responding to an incoming call will be described below with reference to FIG. 3A.

The cellular mobile telephone apparatus 1, when it is powered on (step 30), enters a standby state and remains in this state until it receives a call reception signal destined thereto (step 31). When the cellular mobile telephone apparatus 1 receives the call reception signal (step 32), the control circuit 10 recognizes the reception of an incoming call and generally lets the user know the reception of an incoming call for a predetermined time period with incoming call notification in the form of an alarm generated by a sound-producing input device 11 or vibrations generated by a vibrator 15 (step 33). Simultaneously with this operation, the control circuit 10 monitors whether or not the user manipulates a key on the cellular mobile telephone apparatus 1 in response to the incoming call notification or whether or not a state-holding keys has been previously depressed (step 34).

In this event, if the user does not respond to the incoming call notification in spite of the incoming call notification which has been provided to the user for the predetermined time period (step 35), the control circuit 10 transmits an absence message for notifying the calling party that the user is now absent (step 36), and initiates a recording operation when the calling party wants to leave some message (step 37). Then, the communication channel is cut (step 39) and the cellular mobile telephone apparatus 1 again enters the standby state (step 31) when the calling party cuts the call or an available recording time expires, so as to terminate the recording (step 38).

The predetermined time period provided at step 35 is actually a time period required for the control circuit 10 to notify the user of the reception of an incoming call a number of times which has been previously registered in the control circuit 10 to generate the alarm from the input device 11 or vibrations from the vibrator 15 the registered number of times.

If the user responds by manipulating a key while the reception of the incoming call is being notified to the user (step 34) or if one of the state-holding keys has been previously depressed, an operation specified by an associated key is performed (steps 40-45). Keys used at the reception of an incoming call are classified into two: function keys 16, according to the present invention, and a pending key within a key input device 13. When an arbitrary key other than the two kinds of keys is depressed, an any-key-answer function is invoked to immediately enter the cellular mobile telephone apparatus 1 into a communication state.

When the pending key is depressed, the cellular mobile telephone apparatus 1 remains in a pending state until the pending key is released (steps 46-48). The cellular mobile telephone apparatus 1 enters the communication state when the pending state is released (steps 48, 49). After the cellular mobile telephone apparatus 1 enters the communication state, when the calling party or the user cuts the call, the communication channel is cut and the cellular mobile telephone apparatus 1 again enters the standby state (steps 50, 39, 31).

When the user cannot immediately respond to an incoming call, the user may transmit a message previously stored in the storage circuit 12 (steps 43-45) by selectively depressing one of keys in the input device 13 provided on the cellular mobile telephone apparatus 1, particularly, one of the three function keys 16 which are each assigned a function for transmitting a message to a calling party (steps 34, 40-42).

Specifically explaining with reference again to FIG. 2, since three function keys 16 are provided, up to three kinds of messages may be registered. For example, a message "Since I am now driving a car, I will call you later when I stop the car" may be registered in a function key 1 (F1); a message "Since I am now in a cabin of a train, please hold on for a while until I go to the deck" may be registered in a function key 2 (F2); and a message "Since I am now in conference, please call me again in about one hour" may be registered in a function key 3 (F3).

The control circuit 10 determines which of the function keys 16 has been depressed, and reads a message corresponding to the depressed function key from the storage circuit 12 to transmit the read message (steps 43-45). After the message is transmitted, the cellular mobile telephone apparatus 1 initiates an operation for recording a message, which is similar to the processing performed after the absence message is transmitted, since the calling party may want to leave a message (step 37). When the calling party cuts the call after he/she has recorded the message or when a recording available time expires, the communication channel is cut and the cellular mobile telephone apparatus 1 again enters the standby state (steps 38, 39, 31).

Next, functional operations performed when a message is transmitted will be described with reference to the blocks illustrated in FIG. 1.

The control circuit 10 of the cellular mobile telephone apparatus 1 reads a message to a calling party, previously stored by the user, from the storage circuit 12, inputs the read message to the error correcting encoder/decoder circuit 6, and then transmits the message to the calling party in accordance with the aforementioned transmission operation. In this way, an audio path from the transducer 9 to the error correcting encoder/decoder circuit 6 through the speech coding encoder/decoder circuit 7 may be switched to input a message stored in the storage circuit 12 to the error correcting encoder/decoder circuit 6 so that the modulator/demodulator circuit 5 and the transmitter/receiver circuit 4 may be used in common. Thus, a message stored in the storage circuit 12 can be readily transmitted.

Since one message corresponds to one function key 16, the user may readily attend to an incoming call by selecting the message most appropriate to the situation, which the user is now experiencing, from the three function keys and depressing the function key corresponding to the selected message. In addition, since the calling party can be immediately notified of the situation which the user is experiencing, it is possible to provide the calling party with a material for determining whether the calling party should be waiting without cutting the call, or whether he/she should once give up the call and place another call later. In this way, since useless waiting time is eliminated, the calling party can save call fees. Furthermore, since a channel occupying time is reduced, a load on an exchanger can be reduced.

Since the contents of an actual message may be an extremely simple sentence as the aforementioned examples and take approximately five seconds at most, three messages will require a storage capacity corresponding to approximately 15 seconds. The storage circuit 12 currently used in the cellular mobile telephone apparatus 1 includes an IC memory for message which generally has a capacity corresponding to approximately 30 seconds in time. Therefore, even if a 15-second portion of the storage circuit 12 is reserved for the messages, the remaining 15-second portion may be used to store a message from a calling party.

While in the foregoing embodiment, the three function keys 16 are illustrated in the same size, they need not necessarily have the same size. Rather, in place of the function keys 16, the cellular mobile telephone apparatus may be provided with such function keys that enable the user to recognize their special functionalities only by touching them, without requiring visual confirmation, or with touch switches, which are capable of immediately functioning in response to a touch thereto. These alternatives eliminating the need of visual confirmation are particularly suitable when the user is driving a vehicle or the like. Furthermore, a voice recognition function as illustrated in FIG. 3B may be added to improve its original usefulness. More specifically, FIG. 3B illustrates a flow chart which has additional steps 51-54 other than those in the operation flow of FIG. 3A, and includes all the steps appearing in FIG. 3A.

Referring specifically to FIG. 3B, voice of the user inputted to the transducer 9 of the cellular mobile telephone apparatus 1 illustrated in FIG. 1 is converted to serial digital data by the speech coding encoder/decoder circuit 7, and the serial digital data is again converted to a parallel signal by the error correcting encoder/decoder circuit 6. The control circuit 10, upon sensing the inputted digital voice signal (step 51), performs a Fourier transform on the digital voice signal to extract a spectrum component of the voice (step 52). Then, if the extracted voice signal is larger than a previously detected noise component, the voice signal is recognized as voice (step 53), and a message is transmitted to notify a calling party that the user is driving a car, or the like (step 54).

Figure 3A:
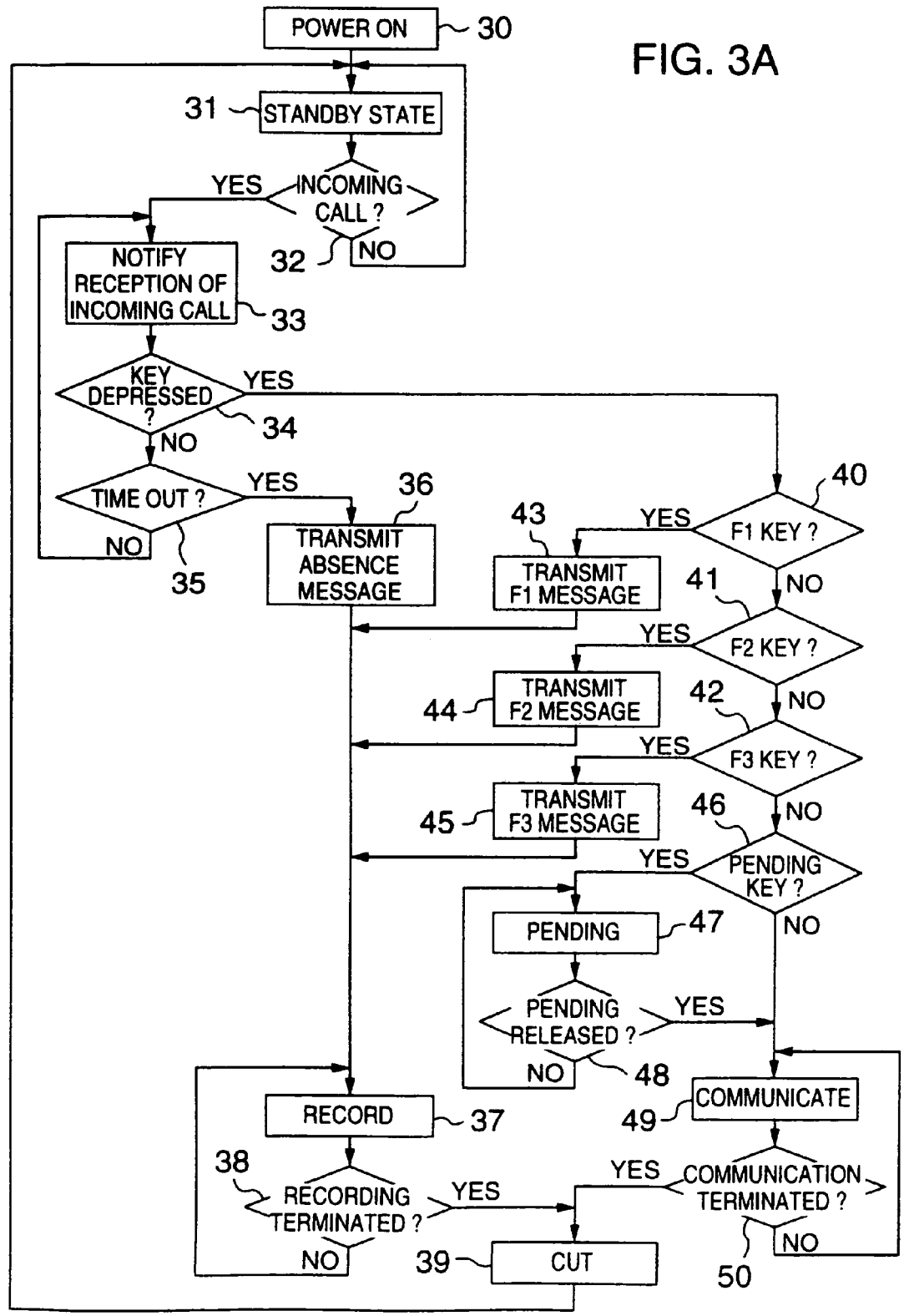
FIG. 3A is a flow chart illustrating an embodiment of the operation of the cellular mobile telephone apparatus according to the present invention.
Figure 3B:
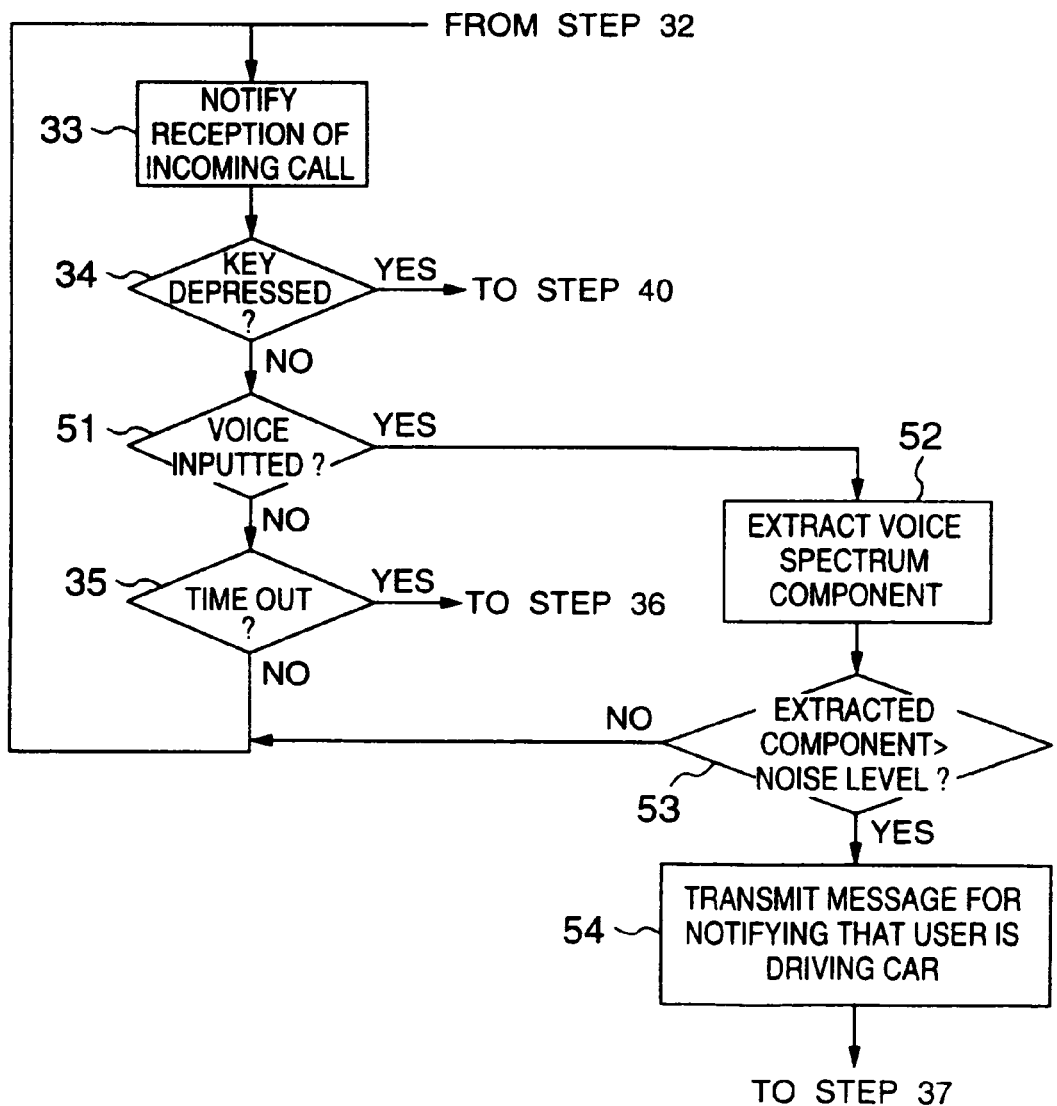
FIG. 3B is a flow chart illustrating a partially modified example of the operation illustrated in FIG. 3A.
Figure 4:
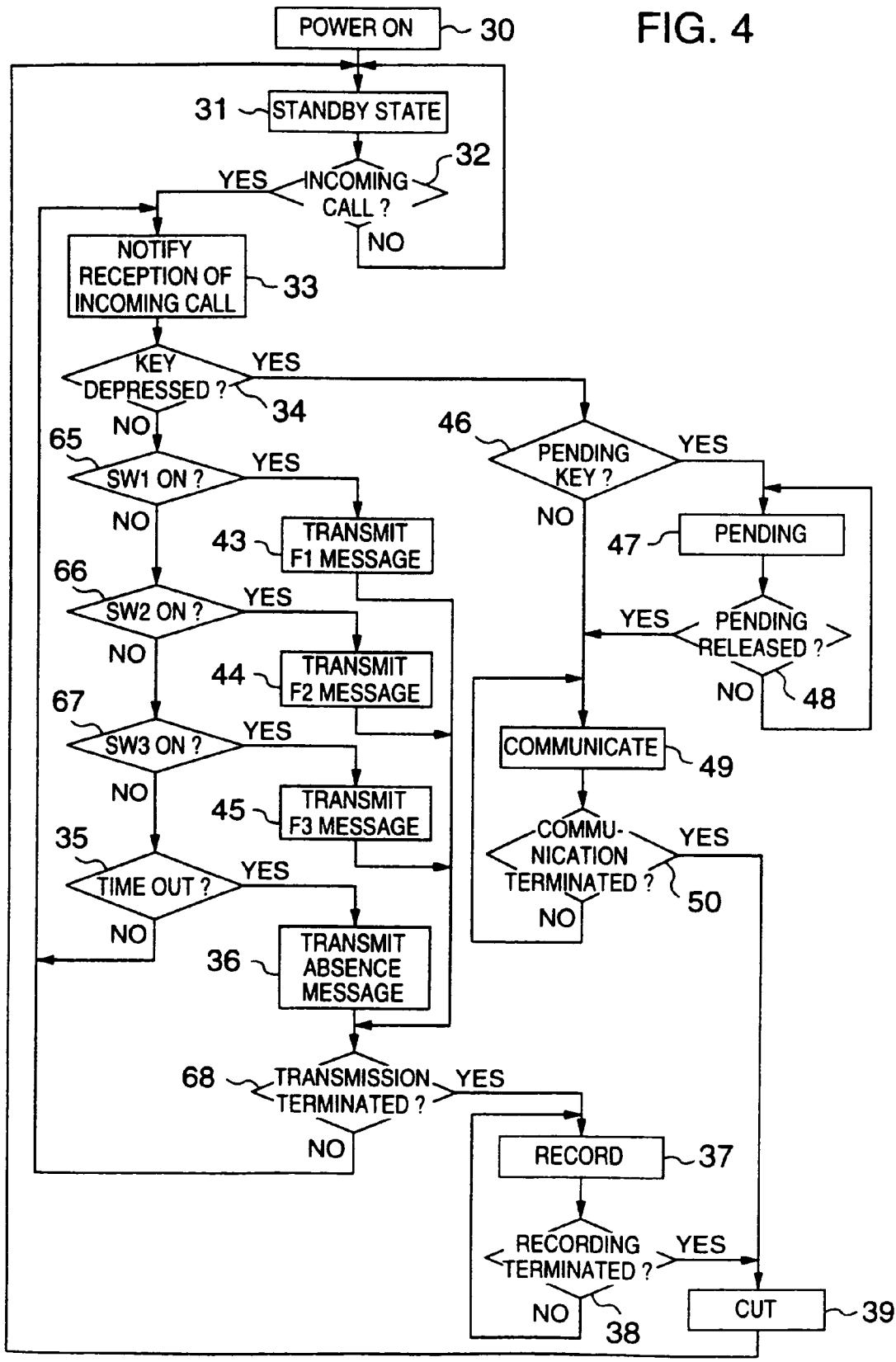
FIG. 4 is a flow chart illustrating another embodiment of the present invention.

In the embodiment illustrated in FIG. 3A, when the user is notified of the reception of an incoming call at step 33, the user finds and depresses a function key for generating an appropriate response message, or it has been previously depressed to transmit it to a calling party, whereas FIG. 4 shows another embodiment employing state-holding function keys F1-F3 as the respective function keys 16. Such state-holding function keys may be slide switches.

According to the embodiment illustrated in FIG. 4, a message to be transmitted when an incoming call is received has been previously set by depressing or sliding a corresponding function key. Thereafter, when an incoming call is received, the reception of the incoming call is notified (steps 32, 33), and the states of the function keys F1-F3 are immediately checked (steps 65-67). If any of the keys is set ON, the transmission of a message corresponding to the key is started (steps 43-45). The step 33 may be deleted. In that case, the previously set message is transmitted without notifying the reception of the incoming call. The notification of the incoming call reception is continued even while the message is being transmitted (step 68), and if depression of any key is sensed during this period (step 34), the flow proceeds to step 46. The rest of the operation steps in FIG. 4 are identical to those in FIG. 3A, so that such steps are designated by the same reference numerals, and explanation thereof is omitted.

Figure 5A:
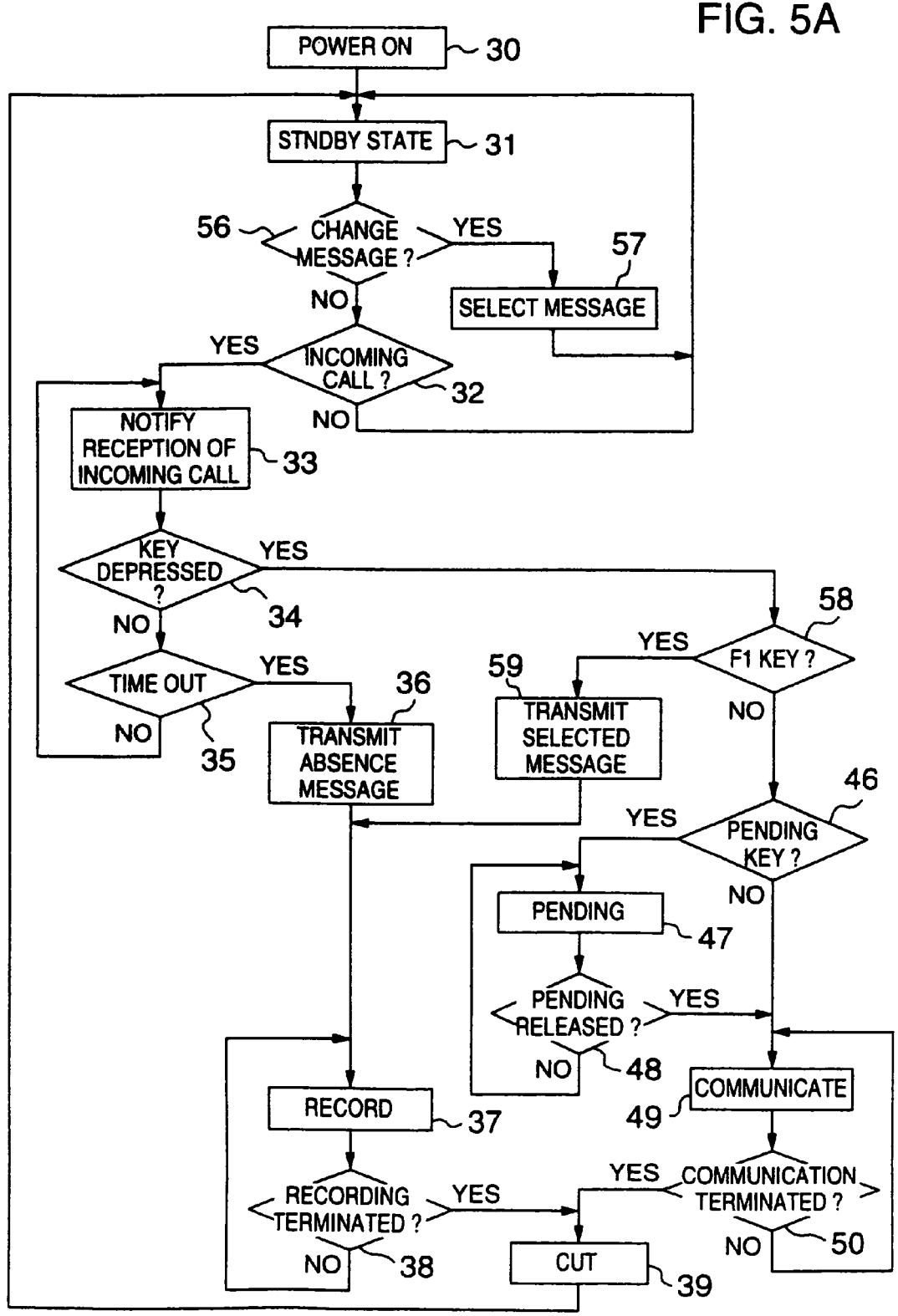
FIGS. 5A and 5B are flow charts illustrating further embodiments of the present invention, respectively.

FIG. 5A is a flow chart illustrating another embodiment of the present invention. In this embodiment, a message is previously selected from among a plurality of messages such that the previously selected message is transmitted in response to depression of a single function key. As is appreciated, only one function key is provided in this embodiment.

Generally, messages required when an incoming call is received may de classified into two: an absence message which may be transmitted when the user is absent, and a message for notifying a calling party of a situation which the user is currently experiencing. While a plurality of messages must be prepared for notifying a calling party of a situation which the user is currently experiencing because a variety of possible situations may exist, only one message most appropriate for indicating the situation at that time is transmitted to the calling party.

In FIG. 5A, the same functional steps as those in FIG. 3A are designated by the same reference numerals and repetitive explanation thereof is omitted.

Referring specifically to FIG. 5A, when a message must be changed, the user selects a message indicative of a situation which the user himself/herself is currently experiencing, using the key input device 13, while the cellular mobile telephone apparatus 1 remains in the standby state (steps 56, 57). Specifically, a plurality of messages are stored at assigned addresses in the storage circuit 12. The storage circuit 12 also comprises a pointer memory 12p for storing the address of a message to be transmitted when the function key 16 is depressed. As the user specifies a number from the key input device 13 for specifying an associated message, the address of the message is stored in the pointer memory 12p. Alternatively, a switch for selecting a message may be used in place of the pointer memory 12p.

In this way, when the function key 16 is simply depressed (steps 34, 58) at the time an incoming call is received (step 33), a message specified by the address previously stored in the pointer memory 12p at step 57 is transmitted to a calling party (step 59). Thus, the user is not required to look for the function key 16 associated with a necessary message in a busy situation, at the time an incoming call is received, and moreover, a large sized function key 16 may be provided on the cellular mobile telephone apparatus 1, thus resulting in an improvement in the operability of the cellular mobile telephone apparatus 1.

While in the embodiment illustrated in FIG. 5A, a message is transmitted by depressing the function key 16 when the reception of an incoming call is notified, the operation flow may directly jump to step 59 to transmit a previously selected message after an incoming call is sensed at step 32 without notifying the reception of the incoming call.

Further, the operation functions at steps 51-54 as illustrated in FIG. 3B may be added to the operation procedure illustrated in FIG. 5A so that a response message may be transmitted in response to detection or recognition of voice pronounced by the user in place of manipulating the function key 16. The voice recognition may be implemented by determining whether or not detected voice matches a predetermined signal pattern, other than a test for examining whether a signal level of detected voice is equal to or higher than a predetermined value.

Figure 5B:
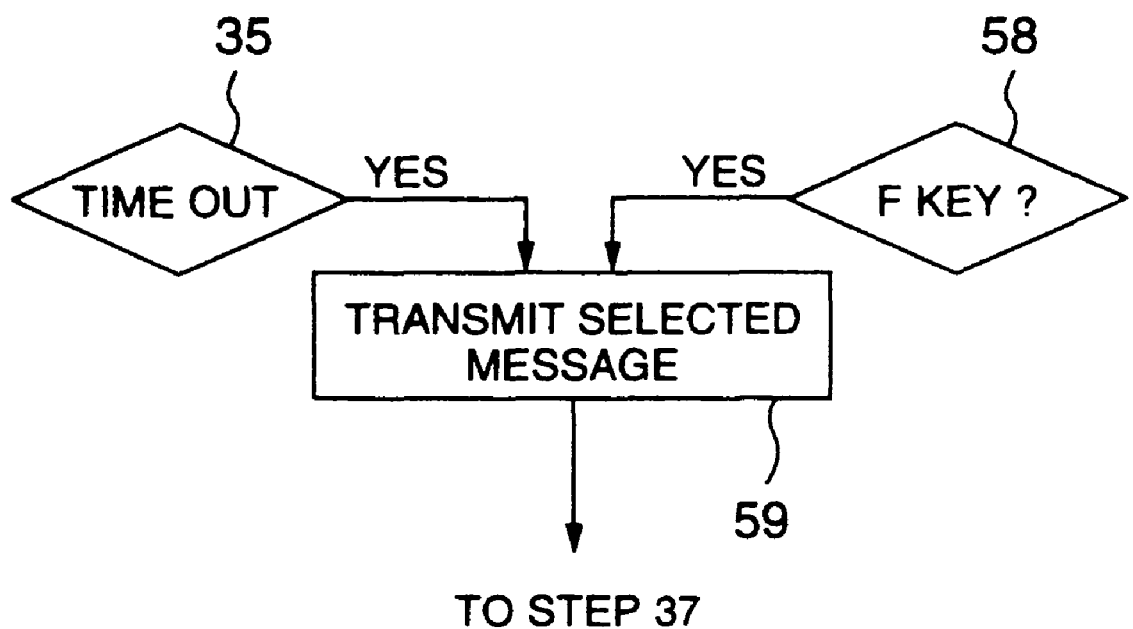
Figure 6A:
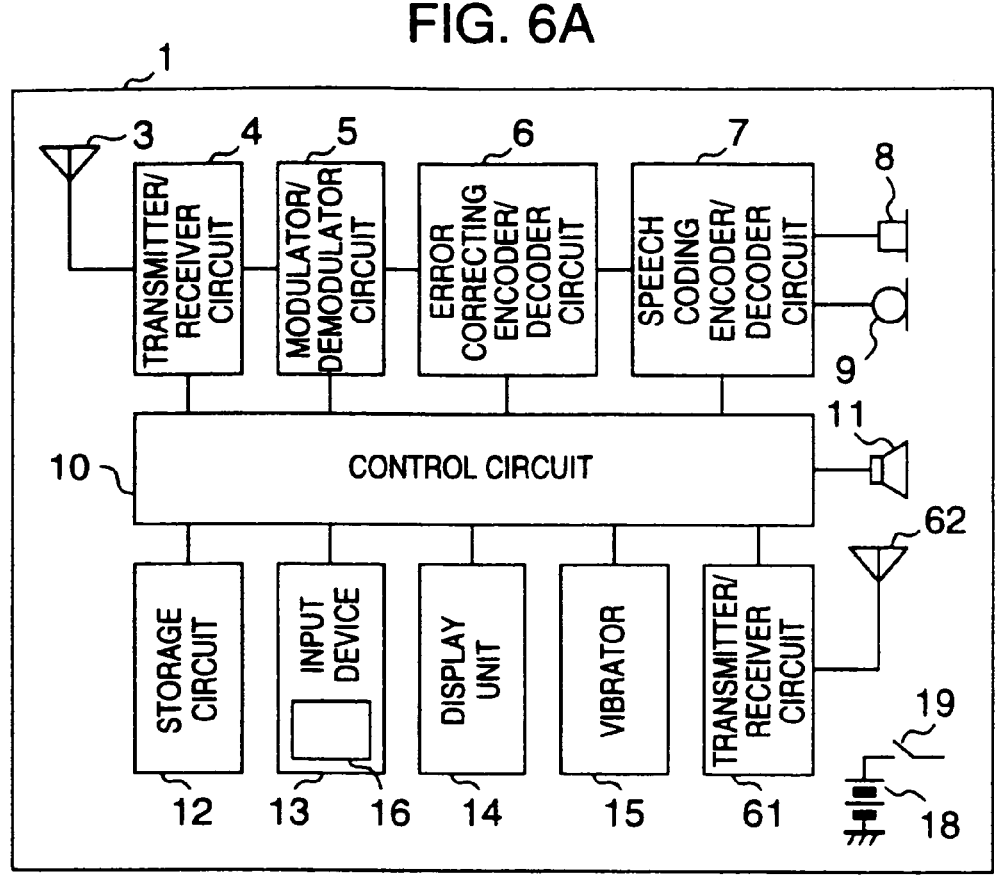
FIGS. 6A and 6B are block diagrams illustrating other configurations of the cellular mobile telephone apparatus according to the present invention, where
Figure 6B:
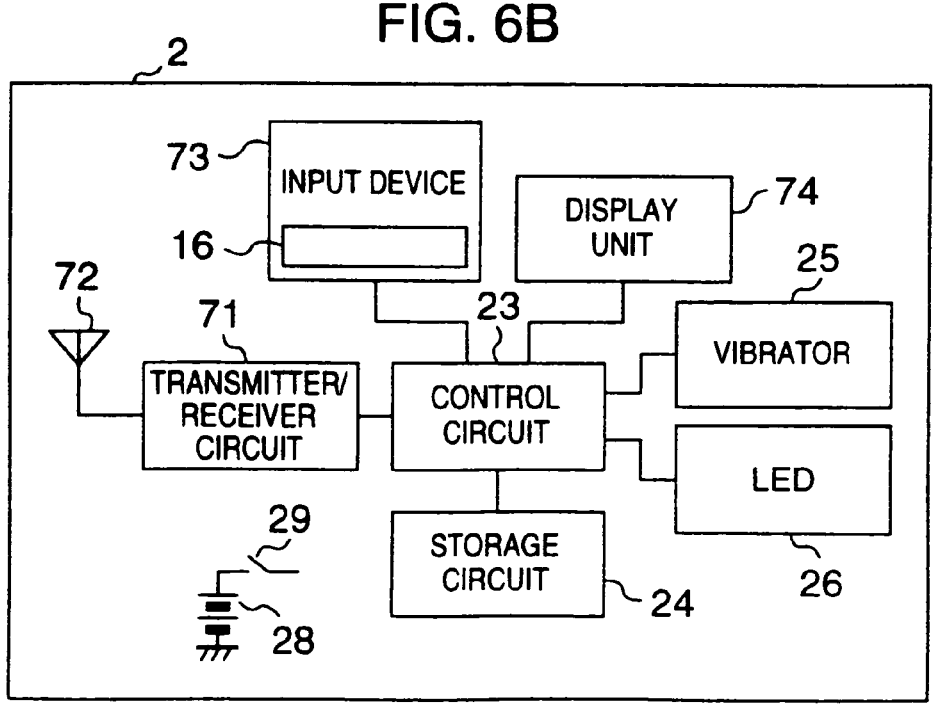

FIG. 5B is a flow chart showing an example in which the step 36 in FIG. 5A is incorporated into the step 59 in FIG. 5A. In that case, the step 57 in FIG. 5A can select also the absence message.

Since such voice recognition is performed during the notification of incoming call reception, which is not in a communication state, the speech coding encoder/decoder circuit 7 and the error correcting encoder/decoder circuit 6 may be commonly used for the voice detection or the voice recognition under the control of the control circuit 10.

Next, another embodiment of the present invention will be described with reference to FIGS. 6A-9.

In FIGS. 6A, 6B, 7A, and 7B, a cellular mobile telephone apparatus comprises a main body constituting a cellular mobile telephone 1 and an incoming call communicator 2. The cellular mobile telephone 1 comprises an incoming call notification transmitter/receiver circuit 61 for communicating with the incoming call communicator 2, and an incoming call notification transmitting/receiving antenna 62, in addition to the configuration and functions of the cellular mobile telephone apparatus described in the aforementioned embodiment.

The incoming call communicator 2 comprises an incoming call notification transmitter/receiver circuit 71 for communicating with the cellular mobile telephone 1; an incoming call notification transmitting/receiving antenna 72; an incoming call notification control circuit 23 for controlling respective components of the incoming call communicator 2; an incoming call notification storage circuit 24 for storing response information and so on; a key input device 73 for inputting information; a function key 16; a vibrator 25 for notifying the reception of an incoming call; an LED display 26 for displaying information from the cellular mobile telephone 1; and a display unit 74. The incoming call communicator 2 is powered by a battery 28 which supplies electrical power to the respective components through a power supply switch 29.

The cellular mobile telephone 1 and the incoming call communicator 2 mutually transmit and receive information through radio transmission. Signal formats and a transmission scheme used for such radio transmission are fully disclosed in Japanese Patent Application No. 147007/1996 filed Jun. 10, 1996 and corresponding U.S. patent application Ser. No. 08/872,138, the contents of which are hereby incorporated by reference. The contents of the applications will be outlined below. Information for radio transmission is defined in accordance with an information transmission format composed of a sequential bit train including a preamble, synchronization information, identification information, and information to be transmitted. This sequential bit train is FM-modulated at a carrier frequency of 300 MHz and transmitted at a transmission rate of 512 bps.

For information transmission, the information is transmitted in units of 8 bits, 2 bits of which are assigned to synchronization bits set at "1" and "0." The synchronization bits are used to resynchronize the information every 8 bits when it is demodulated. With the synchronization bits, a total of approximately 6% of transmission rate error can be tolerated on the transmission side and on the reception side. Thus, effective information within each 8-bit transmitted information is 6 bits.

Figure 7A:
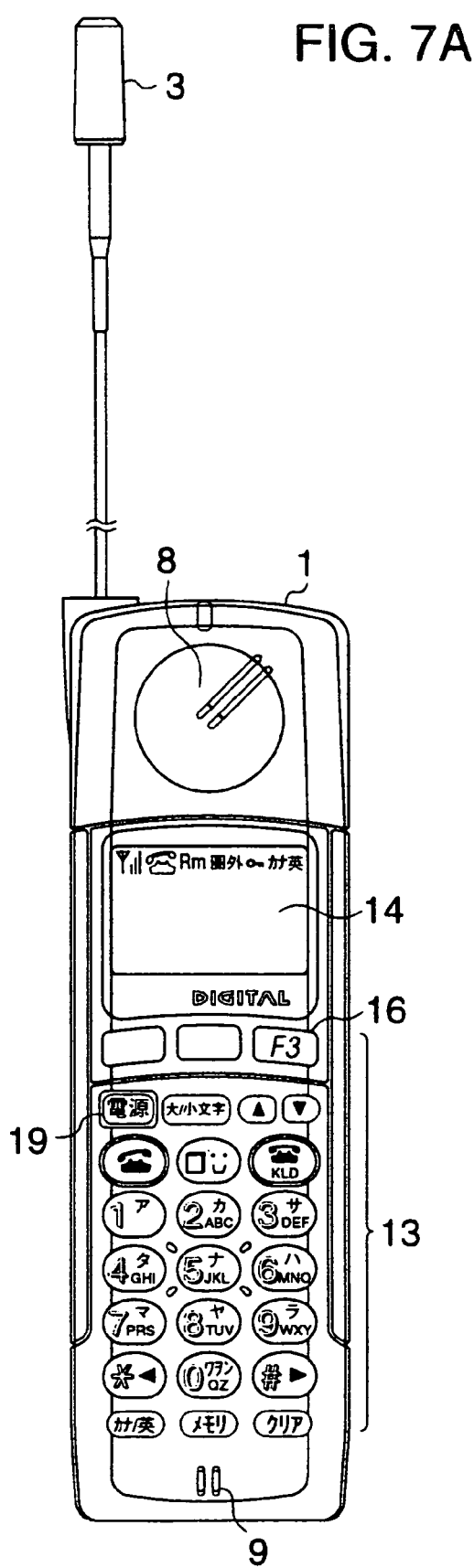
FIGS. 7A and 7B are plan views depicting outer appearances of the cellular mobile telephone body and the incoming call communicator illustrated in FIGS. 6A and 6B, respectively.
Figure 7B:
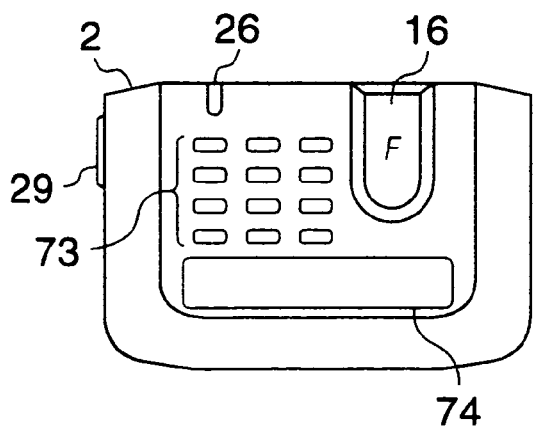
Figure 8:
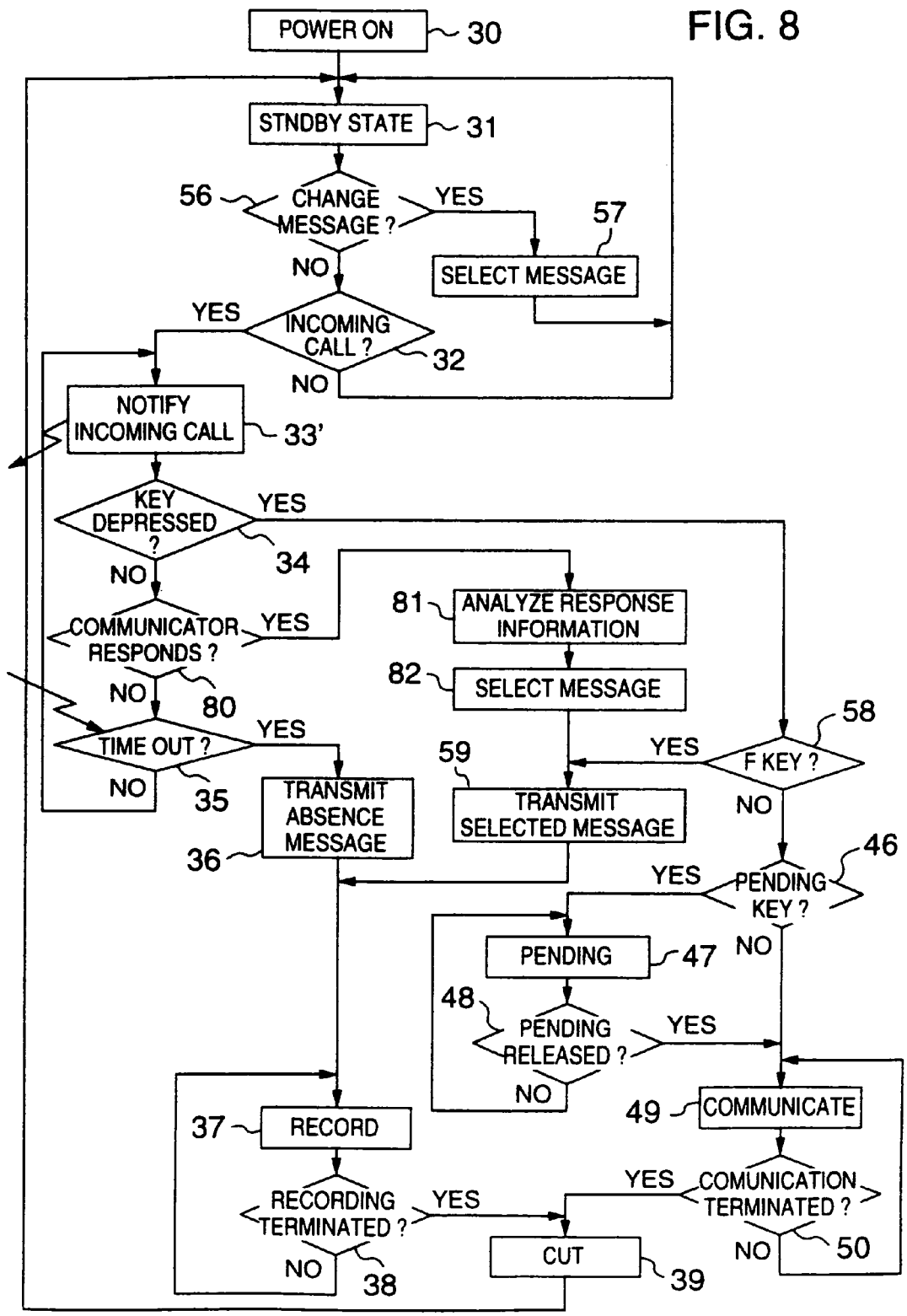
FIG. 8 is a flow chart illustrating the operation of the cellular mobile telephone body illustrated in FIG. 6A.

FIG. 8 illustrates an operation flow of the main body of the cellular mobile telephone apparatus depicted in FIG. 7A, in which steps having the same functions as those in FIG. 5 are designated by the same reference numerals. In the cellular mobile telephone apparatus of this embodiment, the notification of the reception of an incoming call is not only made in the main body 1 but also simultaneously transmitted to the incoming call communicator 2 through a radio signal (step 33'). Then, it is monitored whether or not any key on the main body 1 is manipulated (step 34) or whether or not a response is transmitted from the incoming call communicator 2 (step 80) while the reception of the incoming call is being notified.

In this event, if a key on the cellular mobile telephone body 1 is manipulated, similar processing to the operation in the foregoing embodiment illustrated in FIG. 3A, 3B, 4, or 5 is performed (at step 58 and subsequent steps branched from step 34 through a "yes" path). On the other hand, if a response is transmitted from the incoming call communicator 2 (step 80), the contents of the response information are analyzed (step 81) to select a message to be transmitted (step 82). Operations performed subsequently are similar to the processing performed when a function key on the main body 1 is depressed (at step 59 and subsequent steps). It is noted that the operations at steps 80-82 are disclosed in the aforementioned Japanese Patent Application No. 147007/1996 and the corresponding U.S. patent application Ser. No. 08/872,138.

Figure 9:
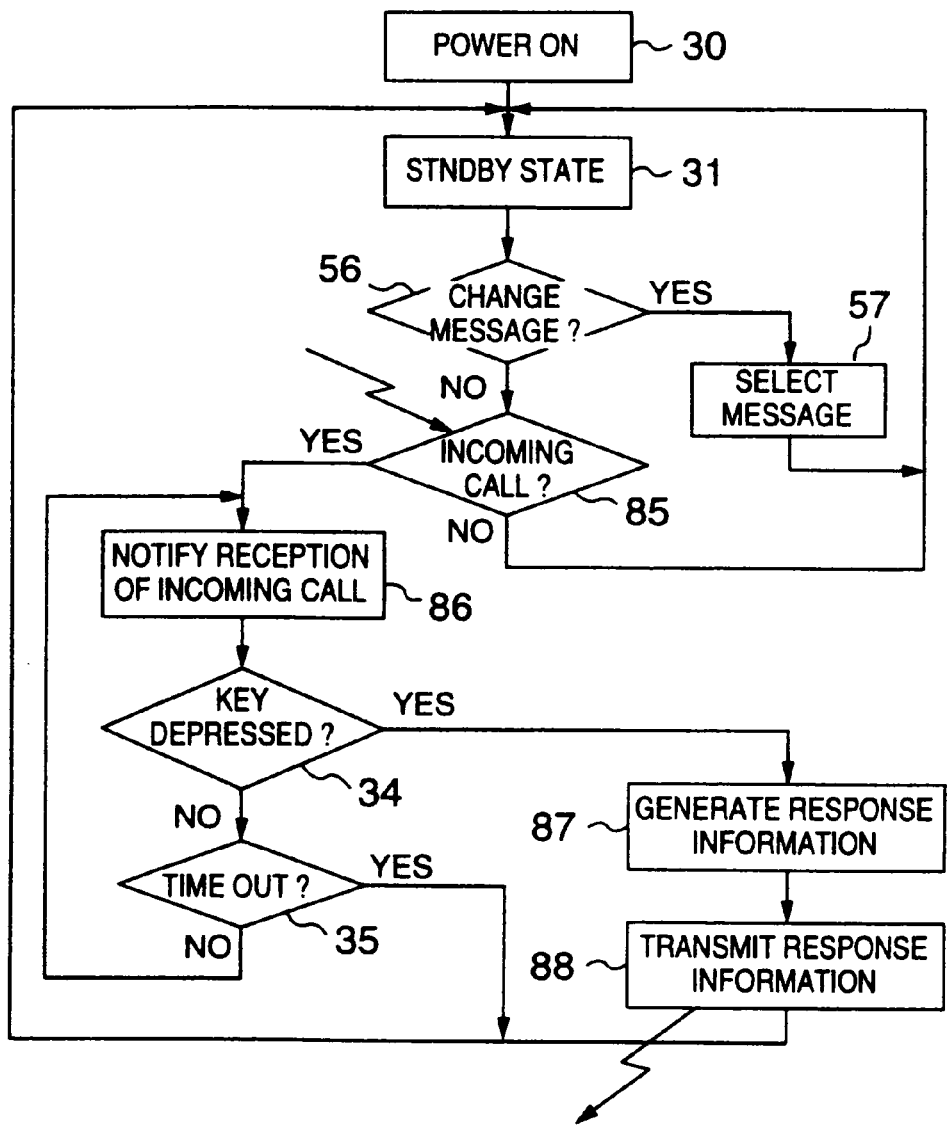
FIG. 9 is a flow chart illustrating the operation of the incoming call communicator illustrated in FIG. 6B.

FIG. 9 illustrates an operation flow of the incoming call communicator 2, where steps having the same functions as those in FIG. 5 are designated by the same reference numerals. The incoming call communicator 2 remains in a standby state until it receives an incoming call notifying signal from the main body 1 (step 31).

Here, the user selects a message to be transmitted from the main body 1 in accordance with the situation which the user himself/herself is now experiencing using the key input device 73 while the incoming call communicator 2 remains in the standby state (steps 56, 57). At step 57, selected response information, which is to be sent when the function key 16 is depressed, is generated and stored in the incoming call notification storage circuit 24.

Upon receiving an incoming call notifying signal, the control circuit 10 recognizes this signal, and makes an incoming call notification to the user for a fixed time period normally in the form of vibrations generated by the vibrator 25 (steps 85, 86). Simultaneously with this, the incoming call communicator 2 monitors whether or not the user manipulates a key in response to the incoming call notification (step 34).

If no response is made to the incoming call notification in spite of the incoming call notification performed for the fixed time period, determination is made that the user is absent, and the incoming call communicator 2 again enters the standby state (steps 35, 31). Actually, the fixed time period may be long enough for the user to make a response, so that it is set to approximately 30 seconds to one minute.

On the other hand, if a response is made through a key manipulation to the incoming call notification while the reception of the incoming call is being notified to the user (step 34), the incoming call communicator 2 generates response information based on information on messages stored in the incoming call notification storage circuit 24 at step 57 (step 87), and transmits the response information to the main body 1 from the incoming call notification transmitter/receiver circuit 41 through the incoming call notification transmitting/receiving antenna 42 (step 88).

By thus providing the compact incoming call communicator 2, even if the main body 1 of the cellular mobile telephone apparatus is held in a bag upon receiving an incoming call, the incoming call communicator 2, if placed in a pocket of clothes, permits the user to transmit a message to a calling party without operating the main body 1 each time the reception of an incoming call is notified. In addition, an improvement in operability is also expected.

Additionally, as an alternative form of this embodiment, the incoming call communicator 2 may be incorporated in a wristwatch to further improve the operability. Since the wristwatch or the like can be directly mounted on a human body, vibrations generated by the vibrator can be advantageously sensed without fail when an incoming call is notified through the vibrations. Also, when a response is made to the notification, the user can manipulate the incoming call communicator 2 without looking for it. Thus, even when the user is driving a vehicle or the like, by way of example, the user can manipulate the incoming call communicator without interfering with the driving.

It should be noted that the radio transmission described in the foregoing embodiments is not limited to a transmission through radio waves, but may be realized by utilizing other media such as infrared rays, ultrasonic waves, and so on.

Next, a further embodiment will be described.

The aforementioned embodiments are characterized in that possible messages to be transmitted to a calling party are stored in the storage circuit of the cellular mobile telephone apparatus. However, it is not necessary to prepare many kinds of messages for transmitting to a calling party upon receiving an incoming call. Actually, ten kinds of messages having different contents may be considered as sufficient. Thus, it is not rational that similar messages are stored in each cellular mobile telephone apparatus.

Figure 10:
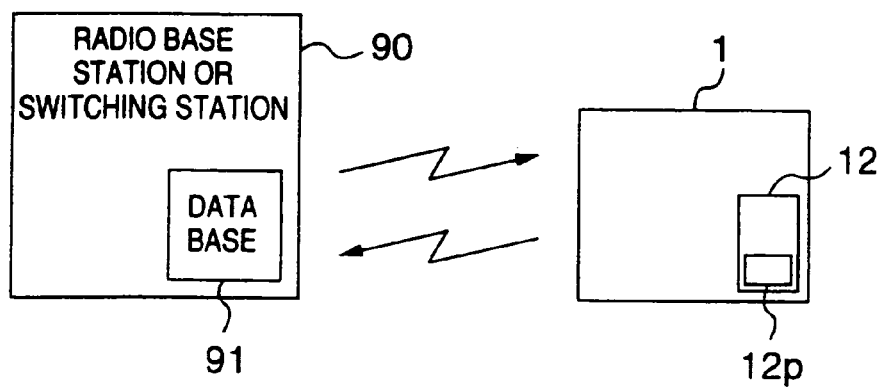
FIG. 10 is a block diagram illustrating a further embodiment of the present invention.

To eliminate this irrationality, a required number of fixed-style messages may be prepared as possible messages to be transmitted to a calling party, and previously stored in a radio base station or in a switching station 90 as a database 91, as illustrated in FIG. 10. The cellular mobile telephone apparatus, in turn, may store an address code for reading a desired message in a pointer memory 12p of a storage circuit 12, such that the user of the cellular mobile telephone apparatus, when he/she wants to transmit a message to a calling party, sends the address code associated with the message stored as the database 91 to the radio base station or to the switching station, in place of a message stored in the storage circuit 12 of the cellular mobile telephone apparatus as shown in the aforementioned embodiments. The radio base station or the switching station analyzes the message code to transmit the specified message from the database 91 to the calling party.

Since the configuration described above eliminates the need to store messages in the storage circuit of each cellular mobile telephone apparatus, the storage circuit of the cellular mobile telephone apparatus can be reduced in size.

While the foregoing embodiments of the present invention have been described in connection with a mobile station of a digital car telephone system, the present invention should not be necessarily limited to this particular scheme, but encompasses any other configurations conceivable for achieving the object of the present invention. Furthermore, the appearances, configurations, circuits, means, and so on of the apparatus described in the embodiments are not intended to limit the present invention.

The cellular mobile telephone apparatus of the present invention enables the user to immediately notify a calling party of his/her current situation, even if the user cannot immediately answer a call.

Even when the user of the cellular mobile telephone apparatus is driving a vehicle or the like, the user can make an appropriate response by notifying a calling party of the current situation without interfering with the driving.

Also, even in a place where the use of the cellular mobile telephone apparatus is restricted (restrictions not due to the influence of electromagnetic waves but due to manners of using the cellular mobile telephone apparatus), the user can make an appropriate response by notifying a calling party of the user's situation without annoying other people around the user.

The invention claimed is:

1. A cellular mobile telephone apparatus, comprising:
   a plurality of incoming call notification portions for notifying incoming calls received from a calling part via a radio base station or a switching station;
   a controller which is adapted to perform controls so that one of the plurality of incoming call notification portions notifies a user of an incoming call to the cellular mobile telephone apparatus; and
   a plurality of input portions for selecting, prior to receiving the incoming call to the cellular mobile telephone apparatus, one of a plurality of response messages, that have been previously stored, to be sent to the calling party at a time when the user cannot respond to the incoming call, each of the plurality of input portions corresponding to one of the plurality of response messages;

wherein, when the incoming call to the cellular mobile telephone apparatus is received by the cellular mobile telephone apparatus after the response message has already been selected, the controller controls such that the selected response message is transmitted to the calling party.

2. The cellular mobile telephone apparatus according to claim 1, wherein the plurality of input portions include a key input device and a transducer.

3. The cellular mobile telephone apparatus according to claim 1, further comprising:
a voice detector adapted to recognize the user's voice pattern by determining whether or not voice information input by a transducer matches a predetermined signal pattern.

4. The cellular mobile telephone apparatus according to claim 2, further comprising:
a voice detector adapted to recognize the user's voice pattern by determining whether or not voice information input by the transducer matches a predetermined signal pattern.

5. The cellular mobile telephone apparatus according to claim 1, wherein the plurality of incoming call notification portions include a vibrator and a sounder.

6. The cellular mobile telephone apparatus according to claim 2, wherein the plurality of incoming call notification portions include a vibrator and a sounder.

7. The cellular mobile telephone apparatus according to claim 3, wherein the plurality of incoming call notification portions include a vibrator and a sounder.

8. A communication system comprising the cellular mobile telephone apparatus according to claim 1, wherein the base or switching the station is adapted to transmit the selected response message to the calling party, when the user does not respond to the incoming call notification of the notification portions for a previously registered time period.

9. A communication system comprising the cellular mobile telephone apparatus according to claim 2, wherein the base or switching station is adapted to transmit the selected response message to the calling party, when the user does not response to the incoming call notification of the notification portions for a previously registered time period.

10. A communication system comprising the cellular mobile telephone apparatus according to claim 3, wherein the base or switching station is adapted to transmit the selected response message to the calling party, when the user does not respond to the incoming call notification of the notification portions for a previously registered time period.

11. A communication system comprising the cellular mobile telephone apparatus according to claim 4, wherein the base or switching station is adapted to transmit the selected response message to the calling party, when the user does not response to the incoming call notification of the notification portions for a previously registered time period.

12. A method of transmitting a response message in a communication system including a cellular mobile telephone apparatus and a radio base station or switching station, the method comprising the steps of:
storing a plurality of response messages for responding to a calling party in a memory provided in the base or switching station;
selecting, in the cellular mobile telephone apparatus, any response message from the plurality of response messages stored in the memory prior to receiving an incoming call to the cellular mobile telephone apparatus from the calling party at a time when a user cannot respond to the incoming call to the cellular mobile telephone apparatus; and
transmitting the selected response message to the calling party after the incoming call to the cellular mobile telephone apparatus is received by the cellular mobile telephone apparatus.

13. A cellular mobile telephone apparatus, comprising:
a plurality of incoming call notification portions for notifying incoming calls received from a calling part via a radio base station or switching station;
a controller which is adapted to perform controls so that one of the plurality of incoming call notification portions notifies a user of an incoming call to the cellular mobile telephone apparatus; and
an input portion for receiving a user input to select, prior to receiving the incoming call to the cellular mobile telephone apparatus, one of a plurality of response messages, that have been previously stored, to be sent to the calling party at a time when the user cannot respond to the incoming call to the cellular mobile telephone apparatus, the user input to select the selected response message being received prior to receiving the incoming call,
wherein if the incoming call to the cellular mobile telephone apparatus is received by the cellular mobile telephone apparatus after the response message has already been selected, the controller controls such that the selected response message is transmitted to the calling party.

14. The cellular mobile telephone apparatus according to claim 13, further comprising:
a voice detector adapted to recognize the user's voice pattern by determining whether or not voice information input by the transducer matches a predetermined signal pattern.

15. The cellular mobile telephone apparatus according to claim 13, further comprising:
a voice detector adapted to recognize the user' voice pattern by determining whether or not voice information input by the transducer matches a predetermined signal pattern.

16. The cellular mobile telephone apparatus according to claim 14, further comprising:
a voice detector adapted to recognize the user's voice pattern by determining whether or not voice information input by the transducer matches a predetermined signal pattern.

17. The cellular mobile telephone apparatus according to claim 13, wherein the plurality of incoming call notification portions include a vibrator and a sounder.

18. The cellular mobile telephone apparatus according to claim 14, wherein the plurality of incoming call notification portions include a vibrator and a sounder.

19. The cellular mobile telephone apparatus according to claim 15, wherein the plurality of incoming call notification portions include a vibrator and a sounder.

20. A communication system comprising the cellular mobile telephone apparatus according to claim 13, wherein the base or switching station is adapted to transmit the selected response message to the calling party, when the user does not respond to the incoming call notification of the notification portions for a previously registered time period.

21. A communication system comprising the cellular mobile telephone system according to claim 14, wherein the base or switching station is adapted to transmit the selected response message to the calling party, when the user does not respond to the incoming call notification of the notification portions for a previously registered time period.

22. A communication system comprising the cellular mobile telephone system according to claim 15, wherein the base or switching station is adapted to transmit the selected response message to the calling party, when the user does not respond to the incoming call notification of the notification portions for a previously registered time period.

23. A communication system comprising the cellular mobile telephone apparatus according to claim 16, wherein the base or switching station is adapted to transmit the selected response message to the calling party, when the user does not respond to the incoming call notification of the notification portions for a previously registered time period.

24. The cellular mobile telephone apparatus according to claim 1, further comprising a transmitter which transmits address information to the base or switching station, wherein the address information is associated with the selected response message stored in a memory of the base or switching station.

25. The method of transmitting a response message in a communication system according to claim 12, further comprising the steps of:
   transmitting, from the cellular mobile telephone apparatus, address information associated with the response message selected at the selecting step to the base or switching station; and
   transmitting, from the base or switching station, the selected response message to the calling party based on the address information transmitted from the cellular mobile telephone apparatus.

26. The cellular mobile telephone apparatus according to claim 13, further comprising a transmitter which transmits address information to the base or switching station, wherein the address information is associated with the selected response message stored in a memory of the base or switching station.

27. The cellular mobile telephone apparatus according to claim 1, wherein the selected response message remains unchanged until changed by the user to another response message.

28. The method of transmitted a response message in a communication system according to claim 12, wherein the selected response message remains unchanged until changed by the user to another response message.

29. The cellular mobile telephone apparatus according to claim 13, wherein the selected response message remains unchanged until changed by the user to another response message.

* * * * *